US009769460B1

(12) United States Patent
Mukherjee et al.

(10) Patent No.: US 9,769,460 B1
(45) Date of Patent: *Sep. 19, 2017

(54) CONVERSION OF MONOSCOPIC VISUAL CONTENT TO STEREOSCOPIC 3D

(71) Applicant: Google Inc., Mountain View, CA (US)

(72) Inventors: Debargha Mukherjee, Sunnyvale, CA (US); Meng Wang, Brookline, MA (US); Chen Wu, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,326

(22) Filed: Jul. 21, 2015

Related U.S. Application Data

(63) Continuation of application No. 13/370,736, filed on Feb. 10, 2012, now Pat. No. 9,111,350.

(51) Int. Cl.
*G06T 15/00* (2011.01)
*H04N 13/02* (2006.01)

(52) U.S. Cl.
CPC .......... *H04N 13/026* (2013.01); *G06T 15/00* (2013.01)

(58) Field of Classification Search
None
See application file for complete search history.

(56) References Cited

U.S. PATENT DOCUMENTS

| 6,785,329 | B1 | 8/2004 | Pan et al. |
|---|---|---|---|
| 7,660,439 | B1 | 2/2010 | Lu et al. |
| 7,860,162 | B2 | 12/2010 | Yokomitsu et al. |
| 8,213,711 | B2 | 7/2012 | Tam et al. |
| 8,249,333 | B2 | 8/2012 | Agarwal et al. |
| 8,330,801 | B2 | 12/2012 | Wang et al. |
| 8,411,931 | B2 | 4/2013 | Zhou et al. |
| 8,421,847 | B2 | 4/2013 | Hsiao |
| 8,488,868 | B2 | 7/2013 | Tam et al. |
| 8,531,507 | B2 | 9/2013 | Provitola |

(Continued)

FOREIGN PATENT DOCUMENTS

| CN | 1466737 | 1/2004 |
|---|---|---|
| DE | 10 2008 016553 A1 | 11/2009 |
| WO | 02013141 A1 | 2/2002 |

OTHER PUBLICATIONS

A. Saxena, S.H. Chung, and A. Ng. 3D-Depth Reconstruction from a Single Still Image. International Journal of Computer Vision (IJCV), 2007.

(Continued)

*Primary Examiner* — Frank Chen
(74) *Attorney, Agent, or Firm* — Lowenstein Sandler LLP

(57) ABSTRACT

A request to convert a two-dimensional image to a three-dimensional image may be received. A feature-to-depth mapping function associated with another three-dimensional image that shares a characteristic with the two-dimensional image that is to be converted to the three-dimensional image may be identified. A depth value for a plurality of pixels of the two-dimensional image may be determined based on the feature-to-depth mapping function associated with the other three-dimensional image. The three-dimensional image may be generated based on the depth value for the plurality of pixels of the two-dimensional image.

19 Claims, 9 Drawing Sheets

(56) References Cited

U.S. PATENT DOCUMENTS

| | | | |
|---|---|---|---|
| 8,644,596 | B1 | 2/2014 | Wu et al. |
| 8,666,146 | B1 | 3/2014 | Smolic et al. |
| 8,953,874 | B2 | 2/2015 | Wu et al. |
| 9,380,283 | B2 | 6/2016 | Ko et al. |
| 9,478,196 | B2 | 10/2016 | Liu |
| 2002/0048395 | A1 | 4/2002 | Harman et al. |
| 2002/0191841 | A1 | 12/2002 | Harman |
| 2005/0053276 | A1 | 3/2005 | Curti et al. |
| 2005/0104964 | A1 | 5/2005 | Bovyrin et al. |
| 2006/0187345 | A1 | 8/2006 | Soto et al. |
| 2006/0274302 | A1 | 12/2006 | Shylanski et al. |
| 2007/0024614 | A1 | 2/2007 | Tam et al. |
| 2007/0047809 | A1 | 3/2007 | Sasaki |
| 2007/0146232 | A1* | 6/2007 | Redert .................. G06T 7/50 345/6 |
| 2008/0199044 | A1 | 8/2008 | Tsurumi |
| 2009/0003687 | A1 | 1/2009 | Agarwal et al. |
| 2009/0116732 | A1 | 5/2009 | Zhou et al. |
| 2009/0185029 | A1 | 7/2009 | Mitsuhashi et al. |
| 2009/0238462 | A1 | 9/2009 | Feris et al. |
| 2009/0310828 | A1 | 12/2009 | Kakadiaris et al. |
| 2009/0322860 | A1 | 12/2009 | Zhang et al. |
| 2010/0080448 | A1 | 4/2010 | Tam et al. |
| 2010/0208986 | A1 | 8/2010 | Cobb et al. |
| 2010/0215251 | A1 | 8/2010 | Klein Gunnewiek et al. |
| 2010/0316257 | A1 | 12/2010 | Xu et al. |
| 2011/0026808 | A1 | 2/2011 | Kim et al. |
| 2011/0026840 | A1 | 2/2011 | Tao et al. |
| 2011/0043540 | A1 | 2/2011 | Fancher et al. |
| 2011/0050853 | A1 | 3/2011 | Zhang et al. |
| 2011/0096832 | A1 | 4/2011 | Zhang et al. |
| 2011/0122126 | A1 | 5/2011 | Han et al. |
| 2011/0150287 | A1 | 6/2011 | Flosdorf et al. |
| 2011/0181588 | A1 | 7/2011 | Barenbrug et al. |
| 2011/0210969 | A1 | 9/2011 | Barenbrug |
| 2011/0242279 | A1 | 10/2011 | Redert et al. |
| 2011/0255775 | A1 | 10/2011 | McNamer et al. |
| 2011/0293248 | A1 | 12/2011 | Toma et al. |
| 2012/0013711 | A1 | 1/2012 | Tamir et al. |
| 2012/0214463 | A1 | 8/2012 | Smith ............... H04M 1/72577 455/418 |
| 2012/0293624 | A1 | 11/2012 | Chen et al. |
| 2013/0106837 | A1 | 5/2013 | Mukherjee et al. |
| 2013/0147911 | A1 | 6/2013 | Karsch ................. H04N 13/026 348/43 |
| 2013/0176445 | A1 | 7/2013 | Streeter et al. |
| 2013/0215239 | A1 | 8/2013 | Wang et al. |

OTHER PUBLICATIONS

A. Saxena, M. Sun, and A.Ng. Make3D: Learning 3D Scene Structure from a Single Still Image. IEEE Transactions on Pattern Analysis and Machine Intelligence (TPAMI), 2008.

A. Torralba, R. Fergus, W.T. Freeman, "80 million tiny images: a large dataset for non-parametric object and scene recognition", IEEE Transactions on Pattern Analysis and Machine Intelligence, vol. 30(11), 2008.

Brox et al., "High Accuracy Optical Flow Estimation Based on a Theory for Warping." European Conference on Computer Vision (ECCV), 2004.

Fehn, C., "Depth-image-based rendering (DIBR), compression, and transmission for a new approach on 3D-TV," Sterioscopic Displays and Virtual Reality Systems XI., vol. 5291, pp. 93-104, May 2004.

Grundmann et al., Auto-Directed Video Stabilization with Robust L1 Optimal Camera Paths. IEEE Conference on Computer Vision and Pattern Recognition (CVPR), 2011.

Khan, et al. "Image-based material editing," ACM Transactions on Graphics, vol. 25, No. 3, pp. 654-663, Proceedings of the ACM SIGGRAPH conference, 2006. Section: 2.1.

Langer et al. "Depth Discrimination from shading under diffuse lighting." Perception vol. 29, pp. 649-660, 2000.

M. Guttmann, L. Wolf, and D. Cohen-Or. Semi-Automatic Stereo Extraction From Video Footage. IEEE International Conference on Computer Vision (ICCV), 2009.

M. Liao, J. Gao, R. Yang, and M. Gong. Video Stereolization: Combining Motion Analysis with User Interaction. IEEE Transactions on Visualization and Computer Graphics (TVCG), 2011.

Zhang et al., "Shape from shading: a survey." IEEE Transactions on Pattern Analysis and Machine Intelligence 21, 8, 690, 1999.

Zhang et al., "Consistent Depth Maps Recovery from a Video Sequence". IEEE Transactions on Pattern Analysis and Machine Intelligence (TPAMI), 31 (6): 974-988, 2009.

B. Liu, S. Gould, and D. Koller. Single Image Depth Estimation From Predicted Semantic Labels. IEEE Conference on Computer Vision and Pattern Recognition (CVPR), 2010.

International Search Report and Written Opinion for PCT/US2012/063435, mailed Dec. 27, 2012.

Sergey Weinstein, 3-D Stereoscopic Reconstruction using Structured Light, May 19, 2006, http://cslab1.bc.edu/-csacademics/pdf/06SergeyWeinstein.pdf.

Preliminary Report on Patentability for PCT/US2012/063435, mailed May 6, 2014.

Extended European Search Report for E.P. Application No. 12845015.2-1902 | 2774124 mailed Sep. 17, 2015.

USPTO; Office Action for U.S. Appl. No. 13/478,449 mailed Oct. 4, 2013.

USPTO; Office Action for U.S. Appl. No. 13/478,449 mailed Mar. 10, 2014.

USPTO; Office Action for U.S. Appl. No. 13/478,449 mailed Aug. 11, 2014.

USPTO; Office Action for U.S. Appl. No. 13/478,449 mailed Jan. 28, 2015.

USPTO; Notice of Allowance for U.S. Appl. No. 13/478,449 mailed Feb. 11, 2016.

USPTO; Office Action for U.S. Appl. No. 13/632,489 mailed Jan. 29, 2015.

USPTO; Office Action for U.S. Appl. No. 13/632,489 mailed Dec. 12, 2015.

USPTO; Notice of Allowance for U.S. Appl. No. 13/527,415, mailed Sep. 27, 2013.

USPTO; Office Action for U.S. Appl. No. 14/170,335 mailed May 5, 2014.

USPTO; Notice of Allowance for U.S. Appl. No. 14/170,335 mailed Oct. 8, 2014.

USPTO; Office Action for U.S. Appl. No. 13/840,623 mailed Apr. 8, 2015.

USPTO; Office Action for U.S. Appl. No. 13/840,623 mailed Jan. 19, 2016.

* cited by examiner

CONVERSION OF MONOSCOPIC VISUAL CONTENT TO STEREOSCOPIC 3D

RELATED APPLICATION

This continuation application claims priority to U.S. patent application Ser. No. 13/370,736 filed on Feb. 10, 2012 and is incorporated by reference herein.

TECHNICAL FIELD

This disclosure relates to the field of image processing and, in particular, to conversion of monoscopic visual content to stereoscopic 3D.

BACKGROUND

Advances in display technology have caused display devices capable of conveying a stereoscopic perception of three-dimensional (3D) depth to a view to become increasingly common. These 3D displays may be found in high-definition (HD) television sets, gaming devices, and other computing devices. The growing number of 3D displays has led to a need for additional 3D visual content (e.g., images, video). Conventionally, creating 3D content has been a difficult and time consuming process. A content creator, for example, would capture a subject using two cameras, combine the video or images from each camera, and use special software to make the 3D effect look accurate. This typically includes a lengthy, highly technical and expensive manual process. Conversion of two-dimensional (2D) images and video to 3D has been performed; however, conventional conversion techniques may not be efficient at converting a large number of images or video. In addition, conventional techniques are limited to converting specific types of images and video and may not be used for general 2D to 3D conversion tasks.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, an image converter receives a two-dimensional image to be converted to a first three-dimensional image. The image converter identifies a feature-to-depth mapping function associated with a second three-dimensional image in a data store. The second three-dimensional image shares a characteristic with the two-dimensional image. The image converter determines a depth value for a plurality of pixels of the two-dimensional image according to the feature-to-depth mapping function and generates the first three-dimensional image based on the depth value for the plurality of pixels of the two-dimensional image.

In one embodiment, a method includes identifying a stereo image pair from a data store; calculating a disparity value for the stereo image pair; determining a plurality of depth values for the stereo image pair based on the disparity value; and generating, based on the plurality of depth values, a feature-to-depth mapping function for the stereo image pair.

BRIEF DESCRIPTION OF THE DRAWINGS

The present disclosure is illustrated by way of example, and not by way of limitation, in the figures of the accompanying drawings.

DETAILED DESCRIPTION

Embodiments are described for conversion of monoscopic visual content to stereoscopic 3D. In one embodiment, an image converter can receive a two-dimensional input image. The input image may be a stand alone image or may be one frame of video, for example. The image converter can convert the input image to a three-dimensional output image by identifying one or more similar images from a data store. Each of these similar images may have a corresponding precomputed feature-to-depth mapping function. The feature-to-depth mapping function may define a depth value associated with a certain feature (e.g., a color) of one or more pixels of the image. If more than one similar image is identified, the feature-to-depth mapping functions for each similar image may be combined to form one final feature-to-depth mapping function. Using this final feature-to-depth mapping function, the image converter can generate a depth map for the input image that includes a depth value for each pixel in the input image. The image converter can use rendering techniques in connection with the depth map to generate the three-dimensional output image, which may be stored or displayed for viewing by a user.

Implementations of the conversion techniques described herein allow for fully automatic conversion of 2D visual content to 3D. This can allow an individual to avoid the costly and time-intensive processes of capturing a 3D image or manually converting an existing 2D image to 3D. The use of a feature-to-depth mapping function, which corresponds to images that are visually similar to the input image, allows for a more accurate prediction of the depth values for the image. In turn, this leads to a more accurate and realistic rendering of the 3D output image. In addition, utilizing a large database of images for the comparison increases the possibility that a visually similar image or images can be found, facilitating the conversion of many types of visual content. In one implementation, millions of images are available for comparison.

Figure 1:
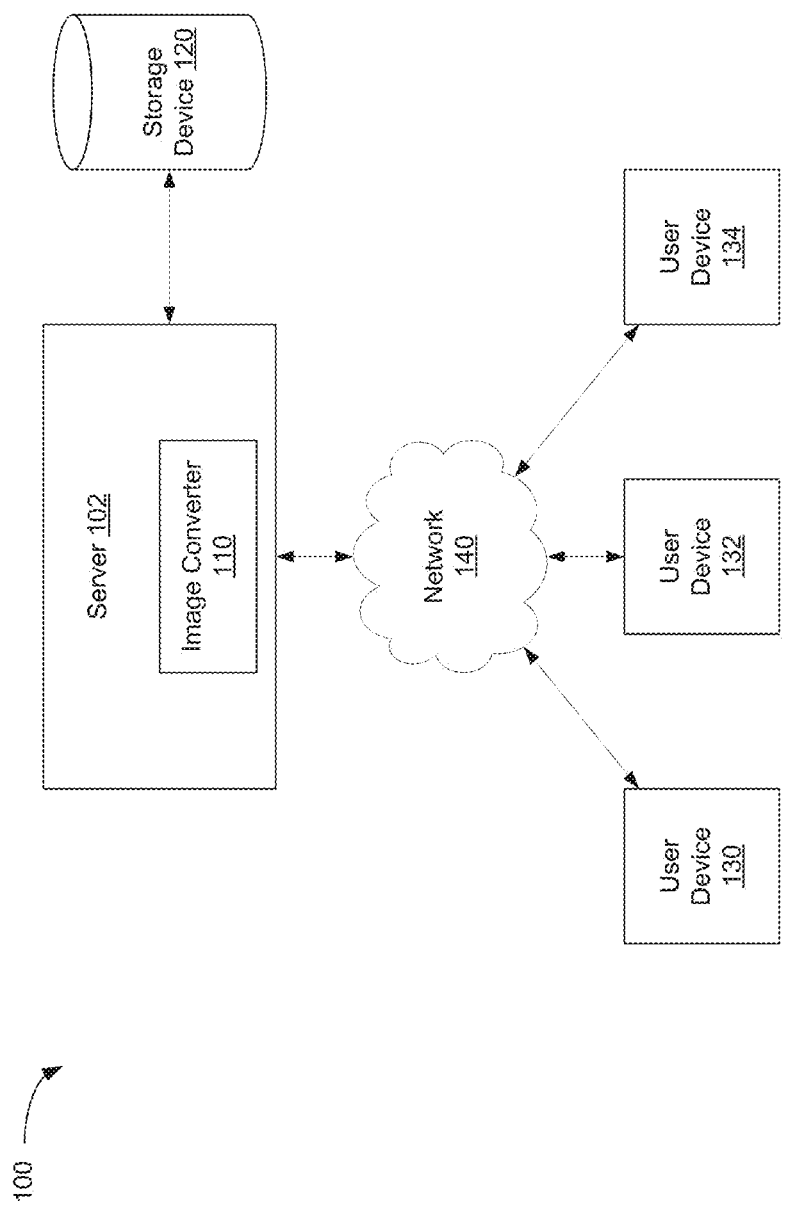
FIG. 1 is a block diagram illustrating an exemplary network architecture in which embodiments of the present invention may be implemented.

FIG. 1 is a block diagram illustrating an exemplary network architecture in which embodiments of the present invention may be implemented. The network architecture 100 may include one or more servers 102 communicating with one or more user devices 130, 132, 134 over one or more networks 140, according to one embodiment. Network 140 can be a local area network (LAN), a wireless network, a telephone network, a mobile communications network, a wide area network (WAN), such as the Internet, or similar communication system. User devices 130, 132, 134 may be any type of computing device including server computers, gateway computers, desktop computers, laptop computers, mobile communications devices, cell phones, smart phones, hand-held computers, tablets, or similar computing devices. The user devices 130, 132, 134 may be variously configured with different features to enable viewing of visual content, such as images, videos, etc.

Server 102 may include a network-accessible server-based functionality, various data stores, and/or other data processing equipment. The server 102 may be implemented by a single machine or a cluster of machines. Server 102 may include, for example, computer system 900 of FIG. 9. In one embodiment, server 102 includes image converter 110. Image converter 110 can receive a two-dimensional input image (e.g., from a user or a computer application program) that is to be converted to a three-dimensional output image. Using similar images from a data store and a corresponding feature-to-depth mapping database in storage device 120, image converter 110 can automatically generate the three-dimensional output image, as will be described below.

In one embodiment, storage device 120 includes an image data store including a number of 3D images as well as a number of 2D images or video. For each of the 3D images, a feature-to-depth mapping database (which may also be stored in storage device 120) may include a predetermined feature-to-depth mapping function. In response to a request from a user (e.g., received through one of user devices 130, 132, 134), image converter 110 can converter one of the 2D images or videos to 3D. In another embodiment, a user may provide a 2D image to be converted that was not previously stored in storage device 120. Image converter 110 can identify 3D images (for which a feature-to-depth mapping function is known) that are visually similar to the 2D image being converted. As will be described below, using the feature-to-depth mapping functions, image converter 110 can automatically generate a 3D output image based on the 2D input image.

In one embodiment server 102 may include image converter 110 and storage device 120. In another embodiment, storage device 120 may be external to server 102 and may be connected to server 102 over a network or other connection. In other embodiments, server 102 may include different and/or additional components which are not shown here so as not to obscure the present invention. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 2:
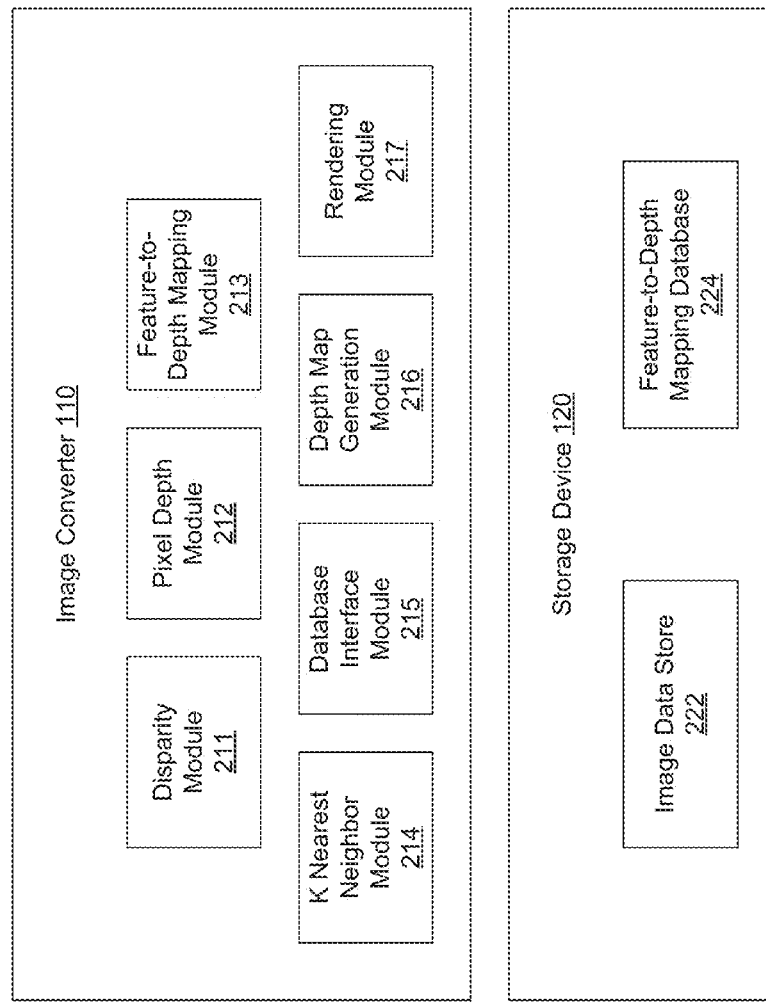
FIG. 2 is a block diagram illustrating an image converter for conversion of monoscopic visual content to stereoscopic 3D, according to an embodiment.

FIG. 2 is a block diagram illustrating an image converter for conversion of monoscopic visual content to stereoscopic 3D, according to an embodiment of the present invention. In one embodiment, image converter 110 may include disparity module 211, pixel depth module 212, feature-to-depth mapping module 213, K nearest neighbor module 214, database interface module 215, depth map generation module 216 and rendering module 217. This arrangement of modules may be a logical separation, and in other embodiments, these modules or other components can be combined together or separated in further components, according to a particular embodiment. In one embodiment, storage device 120 may include image data store 222 and feature-to-depth mapping database 224. In one embodiment, image converter 110 maintains image data store 222 and feature-to-depth mapping database 224. Together these form a data set that may be used for more accurate 2D to 3D conversion. Image converter 110 can receive a two-dimensional input image (e.g., from a user or a computer application program) that is to be converted to a three-dimensional output image. Using similar images from data store 222 and the corresponding feature-to-depth mapping database 224, the various modules of image converter 110 can automatically generate the three-dimensional output image, as will be described below.

In one embodiment, disparity module 211, pixel depth module 212 and feature-to-depth mapping module 213 are used to generate, from the images and videos in image data store 222, data stored in the feature-to-depth mapping database 224. Image data store 222 may include, for example, various 3D images and/or videos. In one embodiment, each 3D image (or frame of a 3D video) includes or is associated with a stereo image pair which, when viewed, creates an illusion of depth. Generally, the image pair includes two images (e.g., left image and right image) of the same subject, taken from slightly different viewpoints (roughly equal to the distance between a person's eyes). Thus, each point in the two images will have a slight offset (measured in pixels) that is proportional to the distance the point is from the viewpoint. This offset may be referred to as disparity.

Disparity module 211 may calculate a disparity for each image in image data store 222. In one embodiment, disparity module 211 can perform an image rectification process, where the images in the image pair are rotated to allow for disparities in only the horizontal direction. Disparity module 211 may employ an algorithm that scans both the left and right images for matching image features. One approach to this problem is to form a smaller image patch around every pixel in the left image. These image patches are compared to possible disparities in the right image by comparing their corresponding image patches. For example, for a disparity of one, the patch in the left image would be compared to a similar-sized patch in the right, shifted to the left by one pixel. The comparison between these two patches can be made by attaining a computational measure from one of the following equations that compares each of the pixels in the patches. For all of the following equations, "L" and "R" refer to the left and right columns, "r" and "c" refer to the current row and column of either images being examined, and "d" refers to the disparity of the right image.

Normalized correlation:

$$\frac{\sum\sum L(r,c) \cdot R(r,c)}{\sqrt{(\sum\sum L(r,c)^2) \cdot (\sum\sum R(r,c)^2)}}$$

Sum of squared differences: $\sum\sum (L(r,c)-R(r,c-d))^2$

Sum of absolute differences: $\sum\sum |L(r,c)-R(r,c-d)|$

The disparity with the lowest computed value using one of the above equations may be considered the disparity for the point in the image. This lowest computed value indicates that the corresponding algorithm has found a good match, relative to the other algorithms, of corresponding features in both images. Disparity module 211 may similarly calculate a disparity for additional points and/or every point in the image pair.

Pixel depth module 212 may determine a depth value for each point in the 3D image. In one embodiment, pixel depth module 212 uses the disparity calculated by disparity module 211 as the depth value. In other embodiments, the depth value is a function of or otherwise based on the disparity (e.g., proportional to the disparity). In one embodiment, pixel depth module 212 determines a depth value for every pixel in the 3D image from data store 222. Pixel depth module 212 may store these depth values, for example, in metadata associated with the images in image data store 222. The depth values may be combined based on pixel location, to generate a depth map. The depth map relates the distances of objects in the image from a viewpoint.

Feature-to-depth mapping module 213 may generate a feature-to-depth mapping function for the 3D image based on one or more features of the pair of images associated with the 3D image and the depth values determined by pixel depth module 212. In one embodiment, the feature used to generate the function may be color. Each pixel of the pair of images associated with the 3D image has a known color value (e.g., determined from image metadata) and may have a depth value determined and stored as metadata by pixel depth module 212. The feature-to-depth mapping function may aggregate the depth values for pixels of the same or similar colors, based on the assumption that objects in the image having the same or similar color will also have a same or similar depth value. In other embodiments, other features may be used to generate the feature-to-depth mapping function, either in place of or in addition to color, such as texture, location, shape, etc. The resulting function can ultimately receive a color value (or other feature value) for a certain pixel or other point as an input, and output a depth value for that pixel. Additional details of the feature-to-depth mapping function are described below with respect to FIG. 4.

In one embodiment, feature-to-depth mapping module 213 may generate multiple feature-to-depth mapping functions for a single image in image data store 222. Different functions may be generated, for example, for different regions of the image. In one embodiment, an image from image data store 222 may be logically divided into a number of regions (e.g., two, four). Feature-to-depth mapping module 213 may treat each region as its own individual image and determine a feature-to-depth mapping function specific to that region in the manner described above. In one embodiment, feature-to-depth mapping module 213 may store the multiple functions corresponding to the image in database 224. In another embodiment, however, the multiple functions may be combined (e.g., using a linear combination based on the distance from a pixel to the center of each region) into a single function that is stored in database 224 for example. The linear combination may eliminate potential "boundary effects" generated by switching feature-to-depth mapping functions across the different regions.

Upon completion of generating the feature-to-depth mapping function, the feature-to-depth mapping function for the image from image data store 222 may be stored in a corresponding entry in feature-to-depth mapping database 224. In one embodiment, feature-to depth mapping database 224 may have some other structure besides a database (e.g., a list of key-value pairs). In one embodiment, feature-to-depth mapping database 224 may be a separate data structure (as shown), however in other embodiments, the mapping information may be stored in the metadata of image data store 222. Image converter 110 can use the feature-to-depth mapping database 224 to automatically generate a 3D output image from a 2D input image.

Image converter 110 may receive a 2D input image to be converted from a user (e.g., through a user interface provided by image converter 110), from another computer application program (e.g., through an application interface, such as an API), or from some other source. K nearest neighbor module 214 may identify images from image data store 222 that are visually similar to the input image. In one embodiment, module 214 may use the K nearest neighbor algorithm (KNN). KNN is a method for classifying objects based on the closest available training examples. K may be a positive integer (e.g., 25). The neighbors may be taken from a set of objects (e.g., stored in image data store 222) for which correct feature values (e.g., color values) and depth values are known. The input image may be compared to the images in image data store 222 and the K images that share the most characteristics with the input image can be identified. The characteristics may include, for example, colors, shapes, textures, or other visual similarities. The parameter K may be a default value or assigned by a user or other program, and may have any value. In one embodiment, a threshold may be defined, such as a number of characteristics that must be shared between the input image and an image from data store 222 if the image is to be used in determining a feature-to-depth mapping function.

In another embodiment, a fingerprinting algorithm may be used to generate a fingerprint (e.g., a bit string) for each image, which is stored for comparison. K nearest neighbor module 214 may generate a fingerprint for the input image (e.g., using the same fingerprinting function) and compare that fingerprint to the stored fingerprints in order to identify visually similar images. In other embodiments, module 214 may use some other sort of pattern recognition, machine learning, prediction analysis, or algorithm to identify visually similar images from image data store 222.

Upon identifying visually similar images from image data store 222, database interface module 215 may identify the corresponding feature-to-depth mapping functions, which may be stored in feature-to-depth mapping database 224. For example, if 25 visually similar images are identified by K nearest neighbor module 214, then the 25 feature-to-depth mapping functions (i.e., one function corresponding to each image) are obtained from feature-to-depth mapping database 224. In one embodiment, database interface module 215 may combine the identified feature-to-depth mapping functions to generate a final feature-to-depth mapping function. The functions may be combined in any number of ways, such as averaging them or identifying the median from the number of different functions as further described below. The resulting function may be stored (e.g., in storage device 120) as the final feature-to-depth mapping function for the input image.

Figure 5:
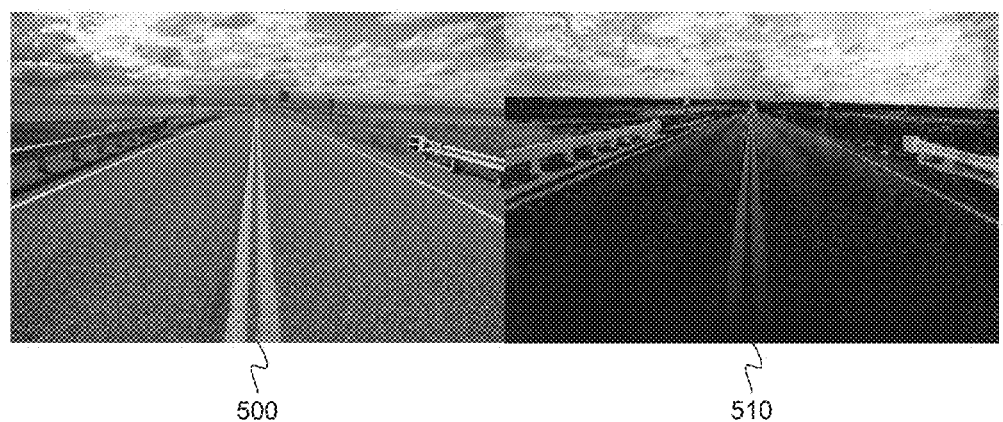
FIG. 5 is a diagram illustrating a depth map computed according to an embodiment.

Depth map generation module 216 may compute a depth map for the input image based on the final feature-to-depth mapping function, e.g., as determined by database interface module 215. Image metadata received with the input image may include, for example, a color value associated with each pixel in the input image. Applying the color values (or other appropriate feature values) as inputs to the final feature-to-depth mapping function may result in a depth value being calculated for each pixel. Depth-map generation module 216 may perform the calculations to make this determination and can store the resulting depth values (e.g., a depth map) in storage device 120. An example of a resulting depth map 510 is shown in FIG. 5.

Rendering module 217 may render a three-dimensional output image (i.e., a stereo image pair) based on the input image and the depth values calculated by depth map generation module 216. In one embodiment, rendering module 217 uses depth image based rendering (DIBR) techniques to generate the 3D image. DIBR techniques can render a 2D image based on another 2D image and a per pixel depth map. The original 2D image becomes one of two views that make up a 3D image, while the DIBR-rendered 2D image becomes the second view. In one embodiment, the original 2D image is the left view, while the rendered 2D image is the right view. In other embodiments, this may be reversed. Given the per-pixel depth map, a displacement map may be generated indicating how much each pixel should move from the left view to the right view. The relationship between depth and displacement may be approximately linear; however, some parameters may be adjusted in order to control how much an object "pops out" of a screen or how much it appears to extend behind the screen. Once the displacement map is generated, the pixels may be shifted from the left view to the right view to render the right view, while making sure that pixels which are in front occlude pixels in the back if multiple pixels from the left view map to the same pixel in the right rendered image space. Once all the pixels have been shifted, there may still be some holes left in the rendered right view. An in-painting (image interpolation) technique may be employed to fill up the holes from the neighboring pixels in the rendered image. This yields the final rendered right view. In order to create high quality rendering, the rendering may be conducted in an intermediate higher resolution pixel grid by interpolating the left view and the per-pixel depth map. Once the rendered image is obtained also at the higher intermediate resolution, it can be scaled back to the desired resolution.

Figure 3:
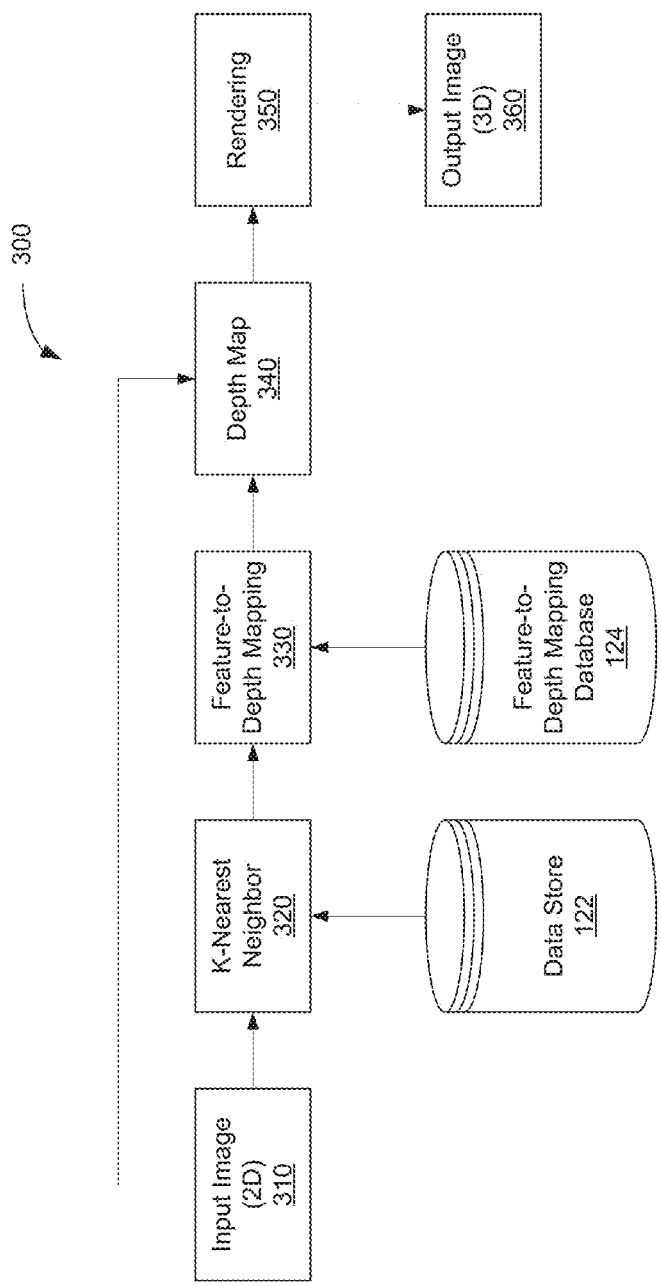
FIG. 3 is a block diagram illustrating an image conversion processing flow, according to an embodiment.

FIG. 3 is a block diagram illustrating an image conversion processing flow, according to an embodiment of the present invention. The various modules and components may be described in regards to their roles in converting monoscopic videos or images to stereoscopic 3D. In one embodiment, the processing flow 300 begins with receiving a two-dimensional input image at block 310. At block 320, visually similar images are identified (e.g., the K nearest neighbors). In one embodiment, K-nearest neighbor module 214 may identify K 3D images from data store 222 that are the most visually similar to the input image. At block 330, a final feature-to-depth mapping function is determined for the input image. Database interface module 215 may identify feature-to-depth mapping functions from feature-to-depth mapping database 224 corresponding to the visually similar images identified at block 320. These functions may be combined (e.g., mean, median) to generate the final feature-to-depth mapping function. At block 340, a depth map is generated based on the final feature-to-depth mapping function and the input image 310. Depth map generation module 216 may generate the depth map by applying a feature value (e.g., color) for each pixel in the input image to the final feature-to-depth mapping function to determine the depth values. At block 350, the depth map may be used with rendering techniques (e.g., DIBR) to generate the three-dimensional output image 360.

Figure 4:
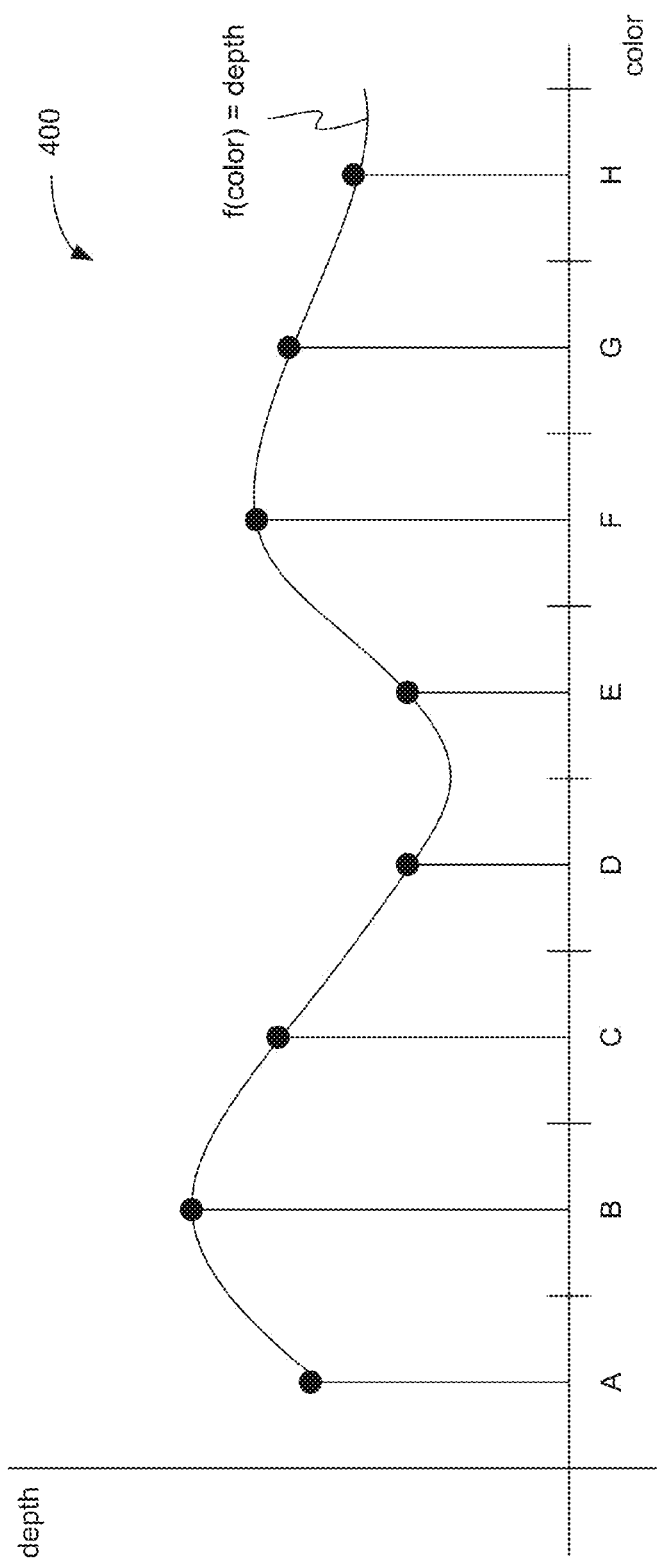
FIG. 4 is a diagram illustrating a feature-to-depth mapping function, according to an embodiment.

FIG. 4 is a diagram illustrating a feature-to-depth mapping function, according to an embodiment of the present invention. In this embodiment, the feature-to-depth mapping function 400 is based on the color of each pixel in an image. The function 400 may receive a color value for a certain pixel or other point as an input and output a depth value for that pixel. FIG. 4 illustrates depth as a function of color in one dimension for ease of understanding. One of skill in the art would recognize that in practice, the function could illustrate similar properties in a multi-dimensional color space (e.g., YUV, RGB). In one embodiment, binning is used to reduce the number of colors taken into account by the function. YUV, for example may have a 24-bit color value, which may be too large for a typical feature-to-depth mapping function. In some cases the over 16 million different colors represented in a 24-bit color scheme may make computing a color-to-depth mapping function too computationally expensive and time consuming. In FIG. 4, the color values have been reduced to eight bins (A-H), although in other embodiments, some other number may be used. For one of the images in image data store 222, for which the color values and depth values are known, the depth values corresponding to each pixel having one of the colors in a certain bin (e.g., bin A) are combined (e.g., averaged) to generate an aggregate depth value. This value may be stored as part of function 400. A similar combination may be performed for the colors in each of the remaining bins, until a series of data points are obtained. Feature-to-depth mapping module 213 may perform some form of polynomial fit (e.g., curve fitting) to generate the feature-to-depth mapping function 400. The resulting function may be expressed as f(color)=depth, or in the case of YUV color, f(YUV)=depth. Thus, the depth value for a given pixel is computed as a function of the YUV color values for that pixel. The function 400 may be stored in feature-to-depth mapping database 224. In one embodiment, the same bins are used for each of the images to generate the final feature-to-depth mapping function. In this manner, the depth values from all of the images used from data 222 can be combined together for pixels having a feature value in the same bin. Thus, for each bin, an average feature value, a median feature value, or some other feature value may be selected as a representative value for that bin. In one embodiment, an outlier rejection algorithm may be used to discard depths that are widely different from the rest of the depth values in the same bin before computing the representative value. This representative value may be used to determine the final feature-to-depth mapping function. In one embodiment, feature-to-depth mapping module 213 may use a weighted average of neighboring bins, where the weight is a function of the occupancy of each bin. Module 213 can use a smoothing kernel to determine the final feature-to-depth mapping function. In order to apply the function to a given pixel, depth map generation module 216 can perform a bi-linear interpolation of the depths using the depths at each bin center.

FIG. 5 is a diagram illustrating a depth map computed according to embodiments of the present invention. Depth map generation module 216 may compute a depth map for the input image based on a feature-to-depth mapping function, such as feature-to-depth mapping function 400 determined by database interface module 215. In the depth map 510 of FIG. 5, the shading is proportional to the distance of the surfaces of scene objects from the viewpoint in the source image 500. In this embodiment, darker colors indicate a depth that is closer to the viewpoint, while lighter colors indicate a depth that is further away. In other embodiments, the shading may be reversed.

Figure 6:
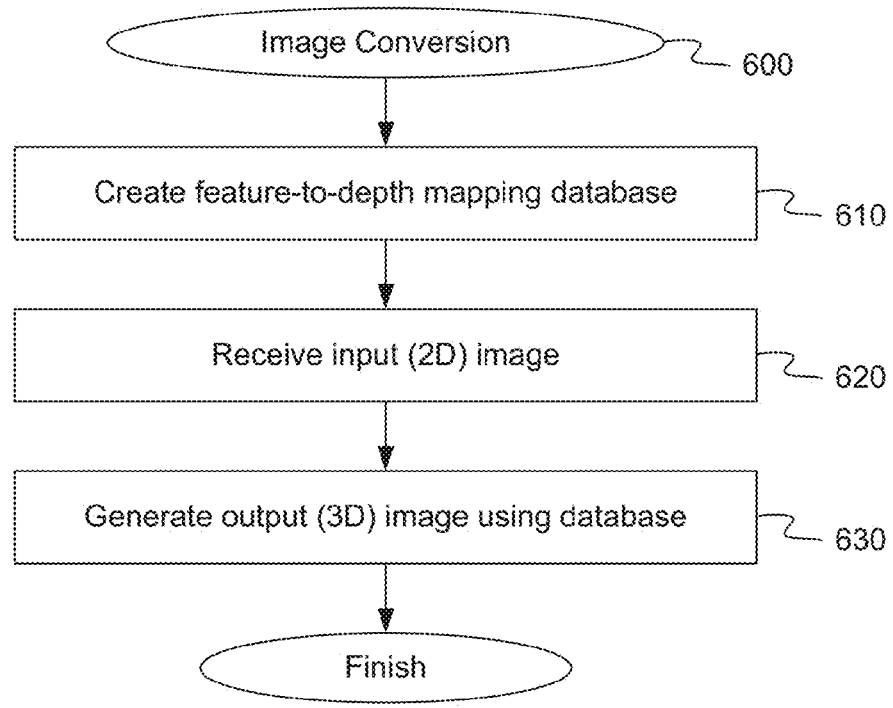
FIG. 6 is a flow diagram illustrating a method for image conversion, according to an embodiment.

FIG. 6 is a flow diagram illustrating a method for image conversion according to an embodiment of the present invention. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can convert monoscopic visual content to stereoscopic 3D. In one embodiment, method 600 may be performed by image converter 110 as shown in FIG. 1.

Referring to FIG. 6, at block 610, method 600 populates a feature-to-depth mapping database 224. In one embodiment disparity module 211 calculates a disparity for a stereo pair of 3D images stored in image data store 222. In one embodiment, disparity module 211 may use a standard stereo algorithm, as discussed above. Pixel depth module 212 may use the calculated disparity to determine a depth value for multiple pixels in the image. Feature-to-depth mapping module 213 may use the depth values to determine a feature-to-depth mapping function, such as function 400, to relate a feature (e.g., color) of the pixels to the depth values. This feature-to-depth mapping function may be stored in an entry of feature-to-depth mapping database 224 corresponding to the image in image data store 222 from which it was created. K nearest neighbor module may find a visual similarity digest (e.g., a hash or signature) for one image (e.g., the left image) of the stereo pair and store the hash value along with the feature-to-depth mapping function in database 224. This process may be repeated for a large set of stereo image pairs (e.g., on the order of millions of images) in image data store 222.

At block 620, method 600 receives a two-dimensional input image for conversion to 3D. The input image may be received from a user (e.g., through a user interface provided by image converter 110), from another computer application program (e.g., through an application interface, such as an API), or from some other source.

At block 630, method 600 generates a three-dimensional output image using information from feature-to-depth mapping database 224. In one embodiment, K nearest neighbor module 214 identifies a number of visually similar images. Database interface module 215 reads the corresponding feature-to-depth mapping functions from database 224 and combines those functions into a final feature-to-depth mapping function. Depth map generation module 216 may apply the feature values of the input image to the final feature-to-depth mapping function to generate a depth map for the input image. Using the depth map, rendering module 217 may generate the three-dimensional output image. In one embodiment, the 3D output image includes a second image to be used in conjunction with the input image to form a stereo pair. The second image may be either the left image or the right image, depending on the embodiment. The first and second images together may form the 3D output image.

Figure 7:
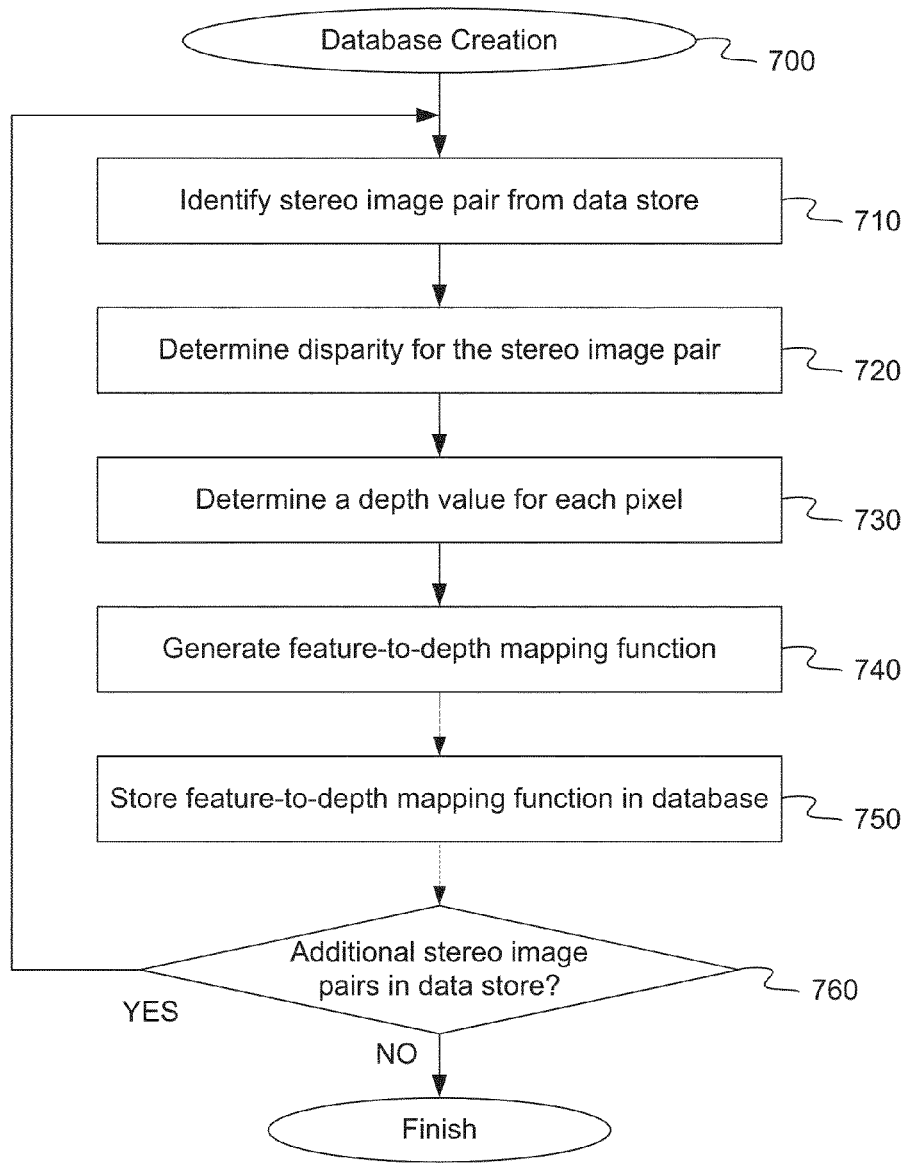
FIG. 7 is a flow diagram illustrating a method for creating feature-to-depth mapping for visual content, according to an embodiment.

FIG. 7 is a flow diagram illustrating a method for creating a feature-to-depth mapping for visual content according to an embodiment of the present invention. The method 700 may be performed by processing logic that comprises hardware (e.g., circuitry, dedicated logic, programmable logic, microcode, etc.), software (e.g., instructions run on a processing device to perform hardware simulation), or a combination thereof. The method 700 can create feature-to-depth mappings used to convert monoscopic visual content to stereoscopic 3D. In one embodiment, method 700 may be performed by image converter 110 as shown in FIG. 1.

Referring to FIG. 7, at block 710, method 700 identifies a stereo image pair from data store 222. In one embodiment, data store 222 may include a corpus of three-dimensional images and/or videos for which feature information (e.g., color) and depth values are known. In one implementation, the corpus includes millions of images and/or videos. At block 720, method 700 determines a disparity for the stereo image pair. In one embodiment, disparity module 211 calculates the disparity using a stereo algorithm. In one embodiment, disparity module 211 calculates the disparity by performing an image rectification process and comparing a given point in each image of the stereo image pair, as described above.

At block 730, method 700 determines a depth value for pixels in the stereo image pair. In one embodiment, pixel depth module 212 may use the disparity calculated by disparity module 211 as the depth value. In other embodiments, the depth value may instead be a function of or otherwise based on the disparity (e.g., proportional to the disparity). Pixel depth module 212 may store these depth values, for example, as metadata associated with the images in image data store 222.

At block 740, method 700 generates a feature-to-depth mapping function for the stereo image pair. In one embodiment, feature-to-depth mapping module 213 may aggregate the depth values for pixels of the same or similar colors, based on the assumption that objects in the image having the same or similar color will also have the same or similar depth value. The resulting function, such as function 400, can ultimately receive a color value (or other feature value) for a certain pixel or other point as an input and output a depth value for that pixel. At block 750, method 700 may store the feature-to-depth mapping function in database 224.

At block 760, method 700 determines if there are additional stereo image pairs in data store 222 that do not have a corresponding feature-to-depth mapping function in database 224. If there are additional stereo image pairs, method 700 may return to block 710 and repeat blocks 710-750 for each remaining stereo image pair in image data store 222.

Figure 8:
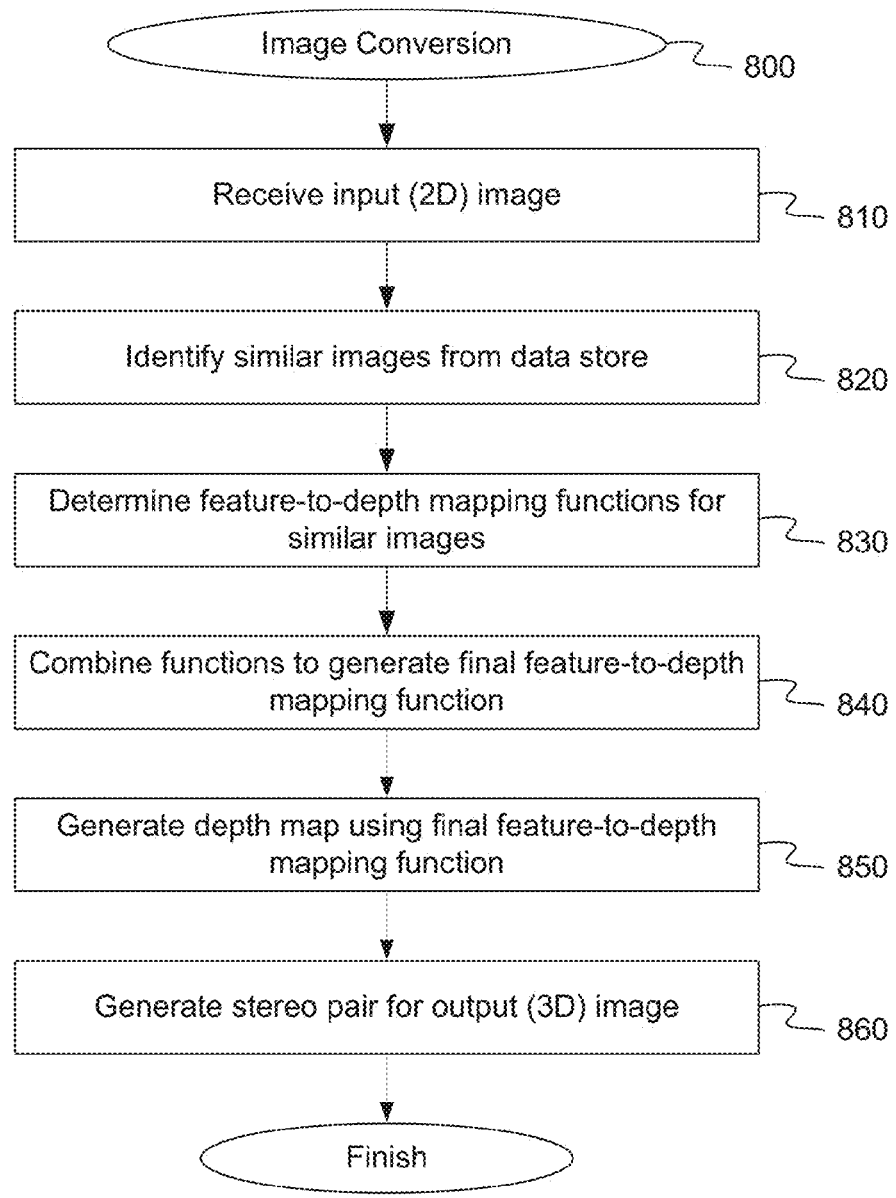
FIG. 8 is a flow diagram illustrating a method for image conversion, according to an embodiment.

FIG. 8 is a flow diagram illustrating a method for image conversion according to an embodiment of the present invention. The method 800 may be performed by processing logic that comprises hardware (e.g., circuitry, dedicated logic, programmable logic, microcode, etc.), software (e.g., instructions run on a processing device to perform hardware simulation), or a combination thereof. The method 800 can convert monoscopic visual content to stereoscopic 3D. In one embodiment, method 800 may be performed by image converter 110 as shown in FIG. 1.

Referring to FIG. 8, at block 810, method 800 receives a two-dimensional input image to be converted to 3D. At block 820, method 800 identifies one or more visually similar images from image data store 222. In one embodiment, K nearest neighbor module 214 uses the K nearest neighbor algorithm to identify K images from the data store 222 that share similar characteristics with the input image. In one embodiment K may be 25 images. In other embodiments, some other number may be used. In another embodiment, K nearest neighbor module 214 may query database 224 for images with the same hash value as a hash computed for the two-dimensional input image.

At block 830, method 800 determines the corresponding feature-to-depth mapping functions for the similar images identified at block 820. The precomputed feature-to-depth mapping functions may be stored in a data store, e.g., database 224 in entries corresponding to the images, or may be otherwise designated as being associated with the similar images. Database interface module 215 may locate the functions in database 224 and, at block 840, may combine the functions to generate a final feature-to-depth mapping function. In one embodiment, the functions may be combined using an average operation, a median operation, or some other operation. In one embodiment, database interface module 215 may select a subset of images that are within a certain distance from the query in the hash domain and find the median of the feature-to-depth mapping functions corresponding to each of those images.

At block 850, method 800 generates a depth map for the input image using the final feature-to-depth mapping function. In one embodiment, depth map generation module 216 may apply color values (or other appropriate feature values) as inputs to the final feature-to-depth mapping function generated at block 840. This results in a depth value being calculated for each pixel of the input image. The depth values may be combined, based on the location of their associated pixels, to form a depth map, e.g., 510 as shown in FIG. 5. In one embodiment, depth map generation module 216 optionally de-noises the map. In another embodiment, depth map generation module 216 generates a depth map for individual tiles within the input image and then interpolates between the separate depth maps.

At block 860, method 800 generates a stereo pair for a three-dimensional output image. In one embodiment, rendering module 217 may render a three-dimensional output image based on the input image and the depth values calculated by depth map generation module 216 at block 850. In one embodiment, rendering module 217 may use depth image based rendering (DIBR) techniques to generate the 3D image. The output image may be stored or displayed for viewing by a user. In one embodiment, the output image includes the input image, which is treated as the left view of a stereo pair, and a second image (e.g., based on the depth values), which is treated as the right view of the stereo pair. In other embodiments, the position of these images may be reversed.

Figure 9:
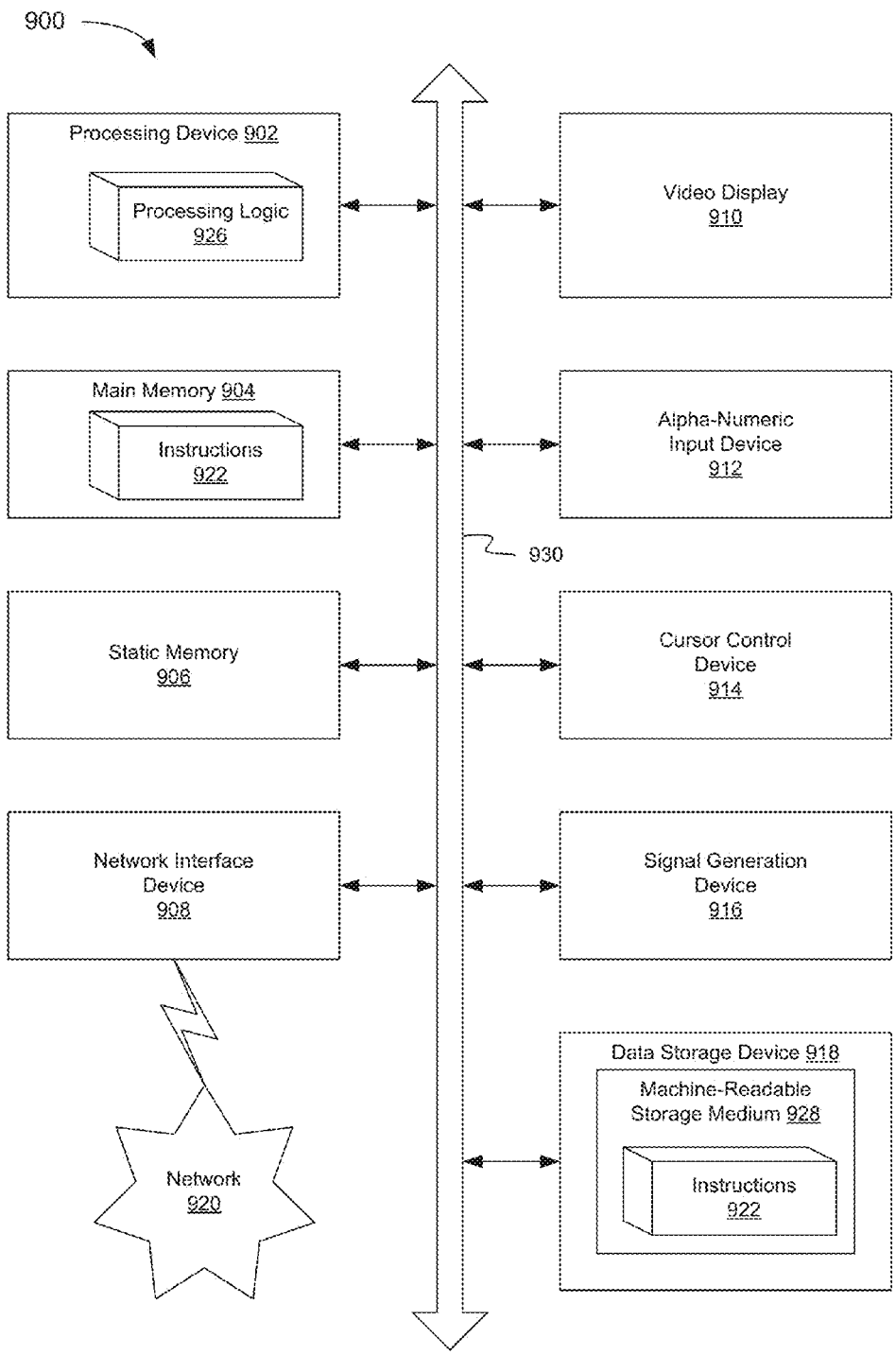
FIG. 9 is a block diagram illustrating one embodiment of a computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server, such as server 102, running image converter 110.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928, on which is stored one or more set of instructions 922 (e.g., software) embodying any one or more of the methodologies of functions described herein. The instructions 922 may also reside, completely or at least partially, within the main memory 904 and/or within the processing device 902 during execution thereof by the computer system 900; the main memory 904 and the processing device 902 also constituting machine-readable storage media. The instructions 922 may further be transmitted or received over a network 920 via the network interface device 908.

The machine-readable storage medium 928 may also be used to store instructions to perform a method for conversion of monoscopic video to stereoscopic 3D, as described herein. While the machine-readable storage medium 928 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or".

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
    receiving a request to convert a two-dimensional image to a three-dimensional image;
    identifying a first feature-to-depth mapping function associated with another three-dimensional image that shares a characteristic with a first region of the two-dimensional image that is to be converted to the three-dimensional image;
    identifying a second feature-to-depth mapping function associated with another three-dimensional image that shares the characteristic with a second region of the two-dimensional image;
    determining, by a processing device, a depth value for a plurality of pixels of the two-dimensional image based on a combination of the first and second feature-to-depth mapping functions, the combination assigning a respective depth value to a particular pixel of the plurality of pixels based on a distance of the particular pixel from another pixel in the first region of the two-dimensional image and another distance of the particular pixel from another pixel in the second region of the two-dimensional image; and
    generating the three-dimensional image based on the depth value for the plurality of pixels of the two-dimensional image.

2. The method of claim 1, wherein the characteristic that is shared corresponds to a visual similarity between the other three-dimensional image and the two-dimensional image.

3. The method of claim 1, wherein the determining of the depth value for the plurality of pixels of the two-dimensional image based on the combination of the first and second feature-to-depth mapping functions is further based on a linear combination in view of a distance of the particular pixel from a center of the first or second region.

4. The method of claim 1, wherein the first and second feature-to-depth mapping functions correspond to a particular depth value based on locations of pixels from the respective other three-dimensional image.

5. The method of claim 1, wherein the first and second feature-to-depth mapping functions correspond to a particular depth value based on shapes of the respective other three-dimensional image.

6. The method of claim 1, wherein the first and second feature-to-depth mapping functions correspond to a particular depth value based on a color value of a pixel from the respective other three-dimensional image.

7. The method of claim 1, wherein the another pixel in the first region is at a center of the first region and the another pixel in the second region is at a center of the second region.

8. The method of claim 1, wherein the combination of the first feature-to-depth mapping function and the second feature-to-depth mapping function is further based on an average of a first depth value associated with the first feature-to-depth mapping function and a second depth value associated with the second feature-to-depth mapping function.

9. A non-transitory machine-readable storage medium storing instructions which, when executed by a processing device, cause the processing device to perform operations comprising:
    receiving a request to convert a two-dimensional image to a three-dimensional image;
    identifying a first feature-to-depth mapping function associated with another three-dimensional image that shares a characteristic with a first region of the two-dimensional image that is to be converted to the three-dimensional image;
    identifying a second feature-to-depth mapping function associated with another three-dimensional image that shares the characteristic with a second region of the two-dimensional image;
    determining, by a processing device, a depth value for a plurality of pixels of the two-dimensional image based on a combination of the first and second feature-to-depth mapping functions, the combination assigning a respective depth value to a particular pixel of the plurality of pixels based on a distance of the particular pixel from another pixel in the first region of the two-dimensional image and another distance of the particular pixel from another pixel in the second region of the two-dimensional image; and
    generating the three-dimensional image based on the depth value for the plurality of pixels of the two-dimensional image.

10. The non-transitory machine-readable storage medium of claim 9, wherein the characteristic that is shared corresponds to a visual similarity between the other three-dimensional image and the two-dimensional image.

11. The non-transitory machine-readable storage medium of claim 9, wherein the determining of the depth value for the plurality of pixels of the two-dimensional image based on the combination of the first and second feature-to-depth mapping functions is further based on a linear combination in view of a distance of the particular pixel from a center of the first or second region.

12. The non-transitory machine-readable storage medium of claim 9, wherein the first and second feature-to-depth mapping functions correspond to a particular depth value based on locations of pixels from the respective other three-dimensional image.

13. The non-transitory machine-readable storage medium of claim 9, wherein the first and second feature-to-depth mapping functions correspond to a particular depth value based on shapes of the respective other three-dimensional image.

14. The non-transitory machine-readable storage medium of claim 9, wherein the first and second feature-to-depth mapping functions correspond to a particular depth value based on a color value of a pixel from the respective other three-dimensional image.

15. A system comprising:
a memory; and
a processing device, operatively coupled with the memory, to:
  receive a request to convert a two-dimensional image to a three-dimensional image;
  identify a first feature-to-depth mapping function associated with another three-dimensional image that shares a characteristic with a first region of the two-dimensional image that is to be converted to the three-dimensional image;
  identify a second feature-to-depth mapping function associated with another three-dimensional image that shares the characteristic with a second region of the two-dimensional image;
  determine a depth value for a plurality of pixels of the two-dimensional image based on a combination of the first and second feature-to-depth mapping functions, the combination assigning a respective depth value to a particular pixel of the plurality of pixels based on a distance of the particular pixel from another pixel in the first region of the two-dimensional image and another distance of the particular pixel from another pixel in the second region of the two-dimensional image; and
  generate the three-dimensional image based on the depth value for the plurality of pixels of the two-dimensional image.

16. The system of claim 15, wherein the characteristic that is shared corresponds to a visual similarity between the other three-dimensional image and the two-dimensional image.

17. The system of claim 15, wherein the determining of the depth value for the plurality of pixels of the two-dimensional image based on the combination of the first and second feature-to-depth mapping functions is further based on a linear combination in view of a distance of the particular pixel from a center of the first or second region.

18. The system of claim 15, wherein the first and second feature-to-depth mapping functions correspond to a particular depth value based on locations of pixels or a shape from the respective other three-dimensional image.

19. The system of claim 15, wherein the first and second feature-to-depth mapping functions correspond to a particular depth value based on a color value of a pixel from of the respective other three-dimensional image.

* * * * *